United States Patent
Neuroth et al.

(10) Patent No.: US 6,479,752 B1
(45) Date of Patent: Nov. 12, 2002

(54) COIL SPRINGS FOR CABLE SUPPORT

(75) Inventors: David H. Neuroth, Tulsa, OK (US); Charles C. Collie, Tulsa, OK (US); Timothy W. Pinkston, Big Cabin, OK (US)

(73) Assignee: Baker Hughes Incorporated, Houston, TX (US)

( * ) Notice: Subject to any disclaimer, the term of this patent is extended or adjusted under 35 U.S.C. 154(b) by 509 days.

(21) Appl. No.: 09/056,498

(22) Filed: Apr. 7, 1998

(51) Int. Cl.[7] ................................................. H01B 7/18
(52) U.S. Cl. .................................................... 174/106 R
(58) Field of Search ........................ 174/106 R, 105 R, 174/28, 47; 166/241.2, 241.4, 241.5, 113, 241.7

(56) References Cited

U.S. PATENT DOCUMENTS

| | | | |
|---|---|---|---|
| 746,096 A | * 12/1903 | Karsch ................. 166/241.5 X |
| 1,891,615 A | * 12/1932 | Bostic ...................... 166/241.4 |
| 1,935,999 A | 11/1933 | Tessky ......................... 193/38 |
| 1,997,880 A | 4/1935 | Watry |
| 2,204,737 A | * 6/1940 | Swallow et al. ............... 174/28 |
| 2,628,682 A | 2/1953 | Wright |
| 2,915,089 A | 12/1959 | Horsting, Sr. |
| 3,628,606 A | * 12/1971 | Bernard .................... 166/241.5 |
| 3,850,275 A | 11/1974 | Helander |
| 3,858,653 A | 1/1975 | Turbyfill |
| 3,895,176 A | * 7/1975 | Cookson et al. ............... 174/28 |
| 4,131,167 A | 12/1978 | Richey |
| 4,440,229 A | 4/1984 | Burch |
| 4,558,738 A | 12/1985 | Howard, Sr. |
| 4,798,246 A | 1/1989 | Best |
| 5,095,993 A | 3/1992 | Huber et al. |
| 5,191,173 A | 3/1993 | Sizer et al. ............. 174/105 R |
| 5,269,377 A | 12/1993 | Martin ........................ 166/385 |
| 5,277,254 A | * 1/1994 | Rullman et al. ..... 166/241.2 X |
| 5,348,097 A | 9/1994 | Giannesini et al. |
| 5,414,217 A | * 5/1995 | Neuroth et al. ......... 174/120 R |
| 5,435,351 A | 7/1995 | Head .......................... 138/111 |

FOREIGN PATENT DOCUMENTS

| | | |
|---|---|---|
| FR | 2660790 A | 10/1991 |
| GB | 2318167 A | 4/1998 |

* cited by examiner

Primary Examiner—Chau N. Nguyen
(74) Attorney, Agent, or Firm—Bracewell & Patterson, L.L.P.

(57) ABSTRACT

Helically wound coil springs are wrapped around and attached at regular intervals to a cable, which is positioned within tubing. The support springs are attached to the cable to provide support to the cable. The upper section of each support spring is affixed to the cable. A remainder of each spring is formed in a long open helix facing downward when the tubing is installed in a well. The open helix portion of the spring is larger than the inside diameter of the coiled tubing. During placement into the coiled tubing, the springs elongate and decrease in diameter. When the coiled tubing is installed vertically within a well, the springs compress due to the weight of the cable and engage the inside surface of the coiled tubing with a substantial portion of their length, thereby supporting the cable.

21 Claims, 2 Drawing Sheets

COIL SPRINGS FOR CABLE SUPPORT

TECHNICAL FIELD

This invention relates in general to a method and apparatus for installing and supporting an electrical submersible pump cable, and in particular to helically wound coil springs affixed to an electrical submersible pump cable for engaging an inside wall of coiled tubing.

BACKGROUND ART

Electrical submersible pumps (ESP) are normally installed on jointed production tubing and powered by an ESP cable attached to the outside of production tubing. All produced fluids are pumped up the production tubing to the surface.

Oil well completions are being developed to deploy ESPs on the bottom of continuous coiled tubing where the power cable is placed inside the coiled tubing. In these installations, produced fluids are pumped up the annulus between the coiled tubing and the production tubing, or well casing or liner. Many advantages are gained through the use of coiled tubing such as faster deployment, the elimination of a need for large workover rigs, and less frictional pumping losses.

Because ESP cable cannot support its total vertical weight, cable support must be provided by the coiled tubing at regular intervals. Various proposals have been made to provide support, such as the use of mechanical anchors. A need exists for anchors which can be used in fairly small diameter coiled tubing, which will accommodate movement associated with thermal expansion and which will accommodate bending of coiled tubing.

DISCLOSURE OF INVENTION

This invention discloses a new method for installing and supporting an ESP cable in a coiled tubing while allowing slight side-to-side or reciprocal movement of the electrical power cable with respect to the tubing as may occur during handling and service. Helically wound coil springs are wrapped around and attached to a cable at regular intervals. The upper section of each coil spring or support spring is affixed to the cable armor by a connecting section such as a cable clamp. A remainder of each spring is formed in a long open helix facing downward when the tubing is installed in a well. The open helix section experiences frictional engagement between the spring and the coiled tubing during installation. The entire surface of the spring may be knurled to increase friction between the spring and the coiled tubing. Additionally, the spring may be provided with a square cross-section to increase the surface area in contact with the coiled tubing. The open helix terminates in a free end. Preferably, the free end is sharpened and hardened for frictional engagement with the inner surface of the tubing.

In one embodiment, the open helix portion of the spring is divided into two sections. The first and longest section is referred to as the undersized section and has a diameter just slightly smaller than the inside of the coiled tubing. The second section located at the very bottom of the helical spring is designed to be slightly larger than the inside diameter of the coiled tubing and is referred to as the oversized section.

A sufficient number of support springs are placed on the cable prior to installation in the tubing. Preferably, the cable is installed in the tubing by pulling the cable in a direction toward the connecting section of the spring. When each spring enters the tubing, the open helix portion of each spring engages the inside diameter of the tubing wall, causing a dragging force. This force stretches the spring, causing the oversized open helix section of the spring to increase in length and decrease in diameter until the stretched spring slides inside the tubing. The process is repeated with each spring support as the entire cable is pulled into the tubing.

When the coiled tubing and cable assembly is placed in a vertical position during installation, the cable is pulled downward by gravity. The outside diameter of the spring, which is preferably knurled, engages the inner surface of the tubing. Movement of the cable in the downward direction with respect to the tubing causes the support springs to compress or shorten due to frictional forces between the spring and the inside surface of the tubing wall. As the helical springs are compressed, the outside diameter of the springs expand to cause a self regulating locking action between the tubing and the spring while preventing the cable from moving downward. The locking action increases with an increased downward force on the cable so as to make a "fail safe" attachment between the cable and the tubing. It has been found that vibration of the coiled tubing, such as may occur during installation, may cause the springs to initially slip within the coiled tubing. However, after the initial slippage, equilibrium is achieved.

BEST MODE OF INVENTION

Figure 1:
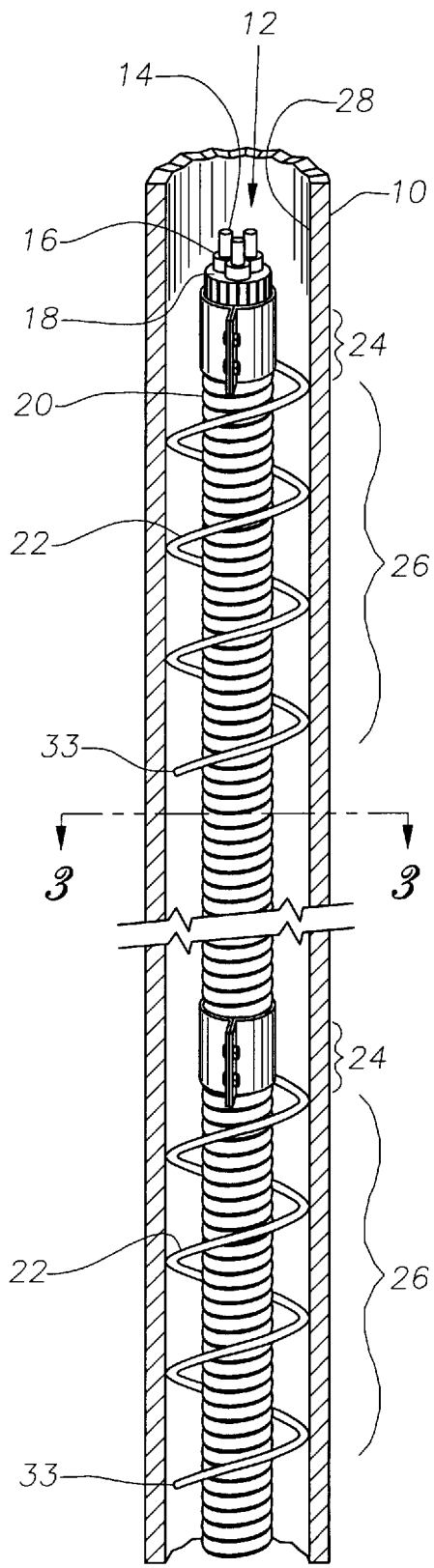
FIG. 1 is an elevational view, partially in cross section of two spring supports of the invention supporting a cable within a tubing string.
Figure 2:
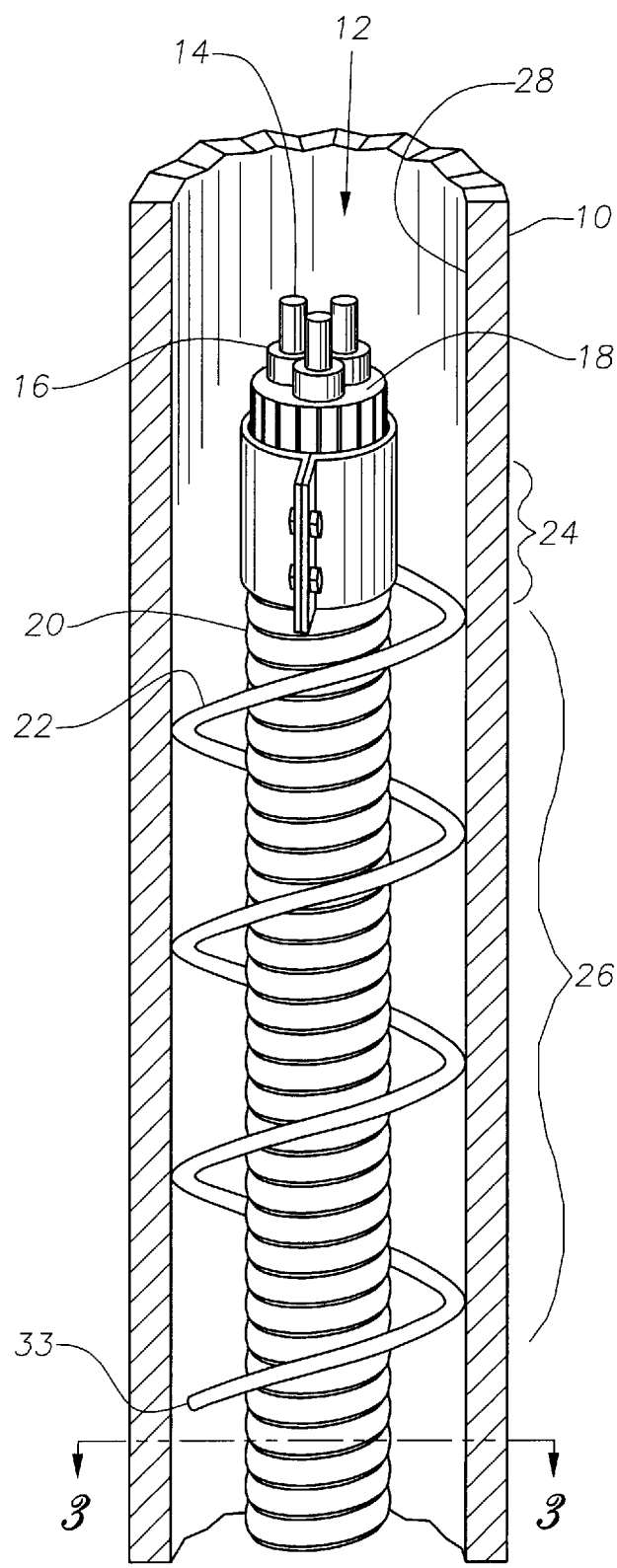
FIG. 2 is an enlarged view of the upper support spring of FIG. 1 shown during installation.
Figure 3:
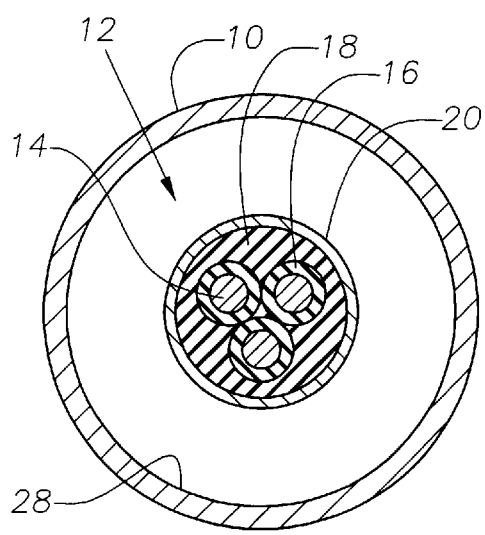
FIG. 3 is a cross sectional view of the cable and tubing string of FIG. 1 taken along the line 3—3 of FIG. 1.
Figure 4:
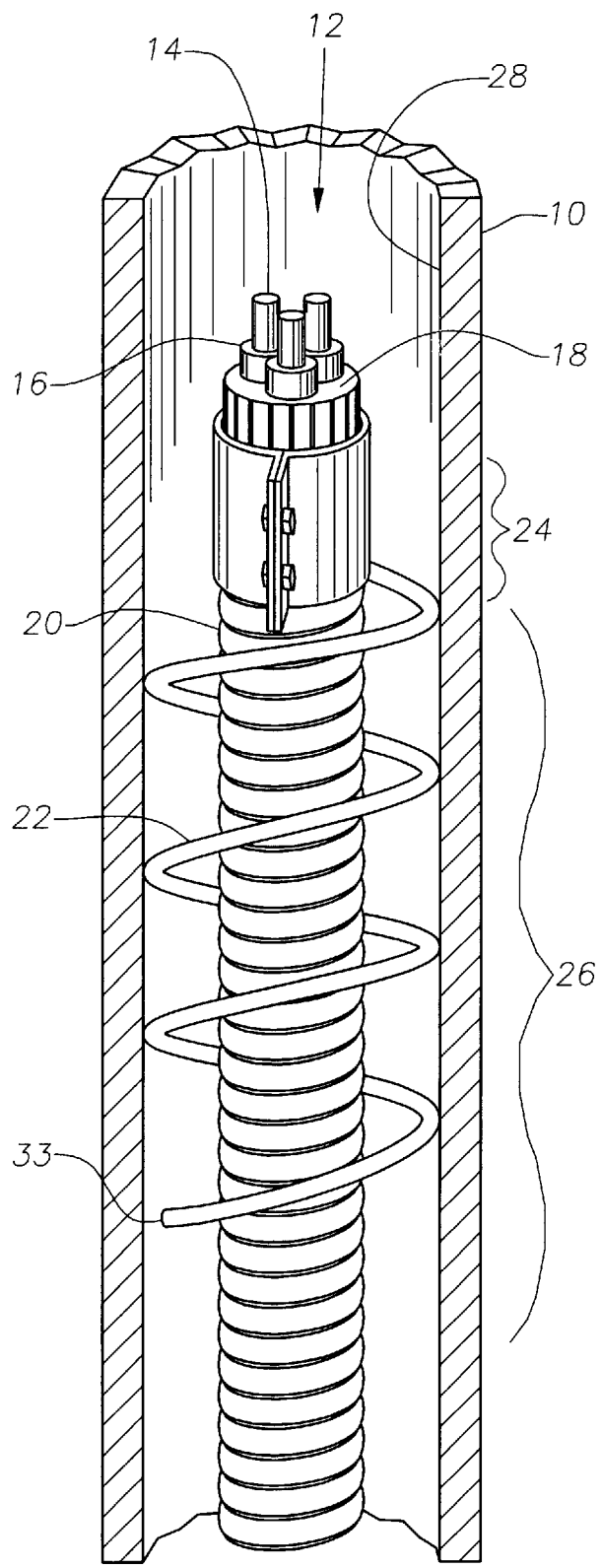
FIG. 4 is an enlarged view of the upper support spring of FIG. 1 shown being compressed by the weight of the cable.

Referring to FIGS. 1–4, tubing 10 is shown encompassing a cable 12 such as a power cable or a cable conductor. A cutaway view of tubing 10 is shown in FIGS. 1, 2 and 4. In the preferred embodiment, cable 12 consists of three conductors 14 to provide power to an electrical submersible pump, each of which is surrounded by conductor insulation 16. However, other types of apparatus may be used with the invention. Conductors 14 and conductor insulation 16 are surrounded by cable jacket 18 which is surrounded by cable armor 20. Armor 20 comprises a strip of metal wound around jacket 18.

To support cable 12 within tubing 10, a plurality of support springs 22 are provided. Support springs 22 have a connecting section or clamp 24 that affixes support spring 22 to cable 12.

Support springs 22 additionally have a helical section 26 for engaging inside surface 28 of tubing 10. In an alternate embodiment, helical section 26 includes an undersized section which has an outside diameter that is initially smaller than an inside diameter of tubing 10 prior to installation. In the alternate embodiment, support spring 22 also has an oversized section which has an initial outside diameter that is larger than an inside diameter of tubing 10 prior to installation. Support spring 22 may have a square cross section to increase the surface area in contact with the inside surface 28 of tubing 10.

Helical section 26 can be seen in an uncompressed or non-load-bearing state in FIGS. 1 and 2. Support spring 22 terminates at free end 33. Free end 33 is preferably sharpened and hardened for engagement with inside surface 28 of tubing 10. Other methods of increasing friction between free end 33 and inside surface 28 of tubing 10 may be used including providing a serrated free end 33. Preferably, the entire surface of spring 22 is knurled to increase friction between spring 22 and inside surface 28 of tubing 10.

A plurality of support springs 22 are affixed to power cable 12 prior to installing cable 12 within tubing 10. Cable 12 and support springs 22 are pulled into tubing 10 using a previously inserted line. When each support spring 22 is pulled within tubing 10, the clamped end of spring 22 enters first. Then, the helical section 26 of each support spring 22 engages inside surface 28 of tubing 10, causing a dragging force as shown in FIGS. 1 and 2. The dragging force stretches spring 22 causing the helical section 26 of spring 22 to increase in length and decrease in diameter until the spring slides inside of tubing 10. This process is repeated with each support spring 22 until the entire power cable 12 is pulled into tubing 10.

In practice, tubing 10 is continuous coiled tubing that is extended into casing or production tubing in a well bore. An electrical submersible pump or other apparatus (not shown) is affixed to a lower end of tubing 10. Cable 12, within tubing 10, may be used for delivering power from a power source to the electrical submersible pump.

When tubing 10 and cable 12 are placed in a vertical position during installation, cable 12 is pulled downward by gravity. The outside diameter of the helical section 26 of spring 22 and free end 33 engages inside wall 28 of tubing 10 to provide frictional contact between spring 22 and inside surface 28 of tubing 10. Downward movement of cable 12 relative to tubing 10 results in a shortening of support springs 22 and a firm engagement of the entire length of helical section 26 with inside surface 28 due to frictional forces between the spring and the inside surface 28 of tubing 10 as shown in FIG. 4. This engagement causes a self-regulating locking action between tubing 10 and spring 22, while preventing the cable from moving downward. In practice, vibration of the coiled tubing may result in initial slippage of the spring relative to the coiled tubing. However, after an initial slippage, equilibrium and locking action are achieved.

Because the springs are formed in an open helix in helical section 26 below clamp 24, slight movement in either direction relative to the tubing 10, such as may be imparted to the cable during coiling and uncoiling is easily accommodated. The spring supports 22 can also accommodate movement associated with thermal expansion of the cable 12 due to conductor heat rise during service. Additionally, the open helix design of support springs 22 provides a passageway for fluids to be pumped through the tubing 10 through the annulus between the cable 12 and the inside surface 28 of tubing 10. Further, since support springs 22 are flexible, they are unlikely to be damaged by bending action of the tubing 10 as it passes from a reel, over a gooseneck and into the well.

Other advantages of this invention include the advantage of requiring very little space for the support springs 22, making it possible to use a smaller diameter coiled tubing than is possible with certain other support methods in use today. The support springs 22 of the invention are economical and easy to install. The support springs 22 also keep the cable 12 centered within the coiled tubing 10, thereby minimizing relative motion of the cable 12 with respect to the tubing 10 during bending. Further, and perhaps most importantly, the cable 12 can be removed for inspection and/or replacement of either the cable 12 or the tubing string 10 by pulling the cable 12 from the tubing 10 in the same direction that it was installed.

While the invention is shown in only one of its forms, it should be apparent to those skilled in the art that it is not so limited, but is susceptible to various changes without departing from the scope of the invention.

What is claimed is:

1. An apparatus for supporting weight of a cable within tubing in a well, comprising:
    a length of tubing;
    an electrical cable within the tubing; and
    at least one spring having a connecting section affixed to the cable and a helical section which engages an inside surface of said tubing and provides axial support to said cable to restrict downward movement of said cable in said tubing during use.

2. An apparatus according to claim 1 wherein said connecting section is a clamp for engagement with said cable.

3. An apparatus according to claim 1 wherein an outer surface of said spring is knurled for engagement with said inside surface of said tubing.

4. An apparatus according to claim 1 wherein said helical section of said spring has a free end and frictionally engages said inside surface of said tubing.

5. An apparatus according to claim 1 wherein said helical section of said spring has a free end that is sharpened and frictionally engages said inside surface of said tubing.

6. An apparatus according to claim 1 wherein said helical section of said spring has a free end that is hardened.

7. An apparatus according to claim 1 wherein said at least one spring comprises a plurality of springs.

8. An apparatus according to claim 1 wherein said helical section of said spring has a maximum outer diameter that frictionally engages said inside surface of said tubing for providing axial support to said cable.

9. An apparatus according to claim 1 wherein said spring has a square cross-section.

10. An electrical line for supporting weight of a cable within tubing in a well, comprising:
    a string of tubing;
    an electrical cable having at least one insulated conductor and a metal armor strip that is wrapped around said electrical cable, the electrical cable being inserted within the tubing; and
    at least one spring having a connecting section affixed to said cable, said spring further comprising a helical section having a maximum outer diameter that frictionally engages an inside surface of said tubing for providing axial support to said cable to restrict downward movement of said cable in said tubing during use.

11. An electrical line according to claim 10 wherein said connecting section is comprised of a clamp.

12. An electrical line according to claim 10 wherein said outer diameter of said helical section is knurled.

13. An electrical line according to claim 10 wherein a free end of said helical section of said spring is sharpened and frictionally engages said inside surface of said tubing.

14. An electrical line according to claim 10 wherein a free end of said helical section of said spring is hardened.

15. An electrical line according to claim 10 wherein a free end of said helical section of said spring is sharpened and hardened.

16. An electrical line according to claim 11 wherein said spring has a square cross-section.

17. A method of supporting weight of an electrical cable within a length of tubing in a well comprising:
   affixing a first end of a plurality of support springs onto a cable, each of said support springs having a second end which surrounds at least a portion of said cable;
   pulling said cable and said support springs into a length of tubing that is sized so that an outer diameter of each of the springs frictionally engages an inner surface of the tubing length;
   lowering said tubing into a well, the cable having a weight resulting in a locking action between said inside surface of said tubing length and said support springs; and
   supporting the weight of said electrical cable with said support springs.

18. A method of supporting a cable within a length of tubing according to claim 17 wherein said support springs are stretched during pulling of said cable into said tubing length, resulting in an increase in length and reduction in diameter of said support springs.

19. A method of supporting a cable within a length of tubing according to claim 17 wherein the weight of said cable applies a downward force on said support springs, resulting in a shortening of said support springs and an increase in an outside diameter of said support springs for forcing an engagement between outer diameters of said support springs and an inner diameter of said tubing length over a substantial length of each of said support springs.

20. A method of installing a cable within a length of tubing for use in a well comprising the steps of:
   affixing a plurality of support springs to a power cable, wherein said support springs have an attached end and a free end;
   installing said power cable in the length of tubing, wherein said attached end of said support springs enter said tubing before said free end of said support springs; and
   engaging an inside surface of said tubing with said support springs, which results in a dragging force and elongation of said springs.

21. The method of installing according to claim 20 wherein:
   said power cable has helically wrapped metal armor configuration; and
   said attached end of said support spring has a helical configuration for complementary engagement with said helically wrapped metal armor.

* * * * *